Sept. 11, 1945.     F. P. NOFFSINGER     2,384,483
PLOW ATTACHMENT FOR TRACTORS
Original Filed March 16, 1944
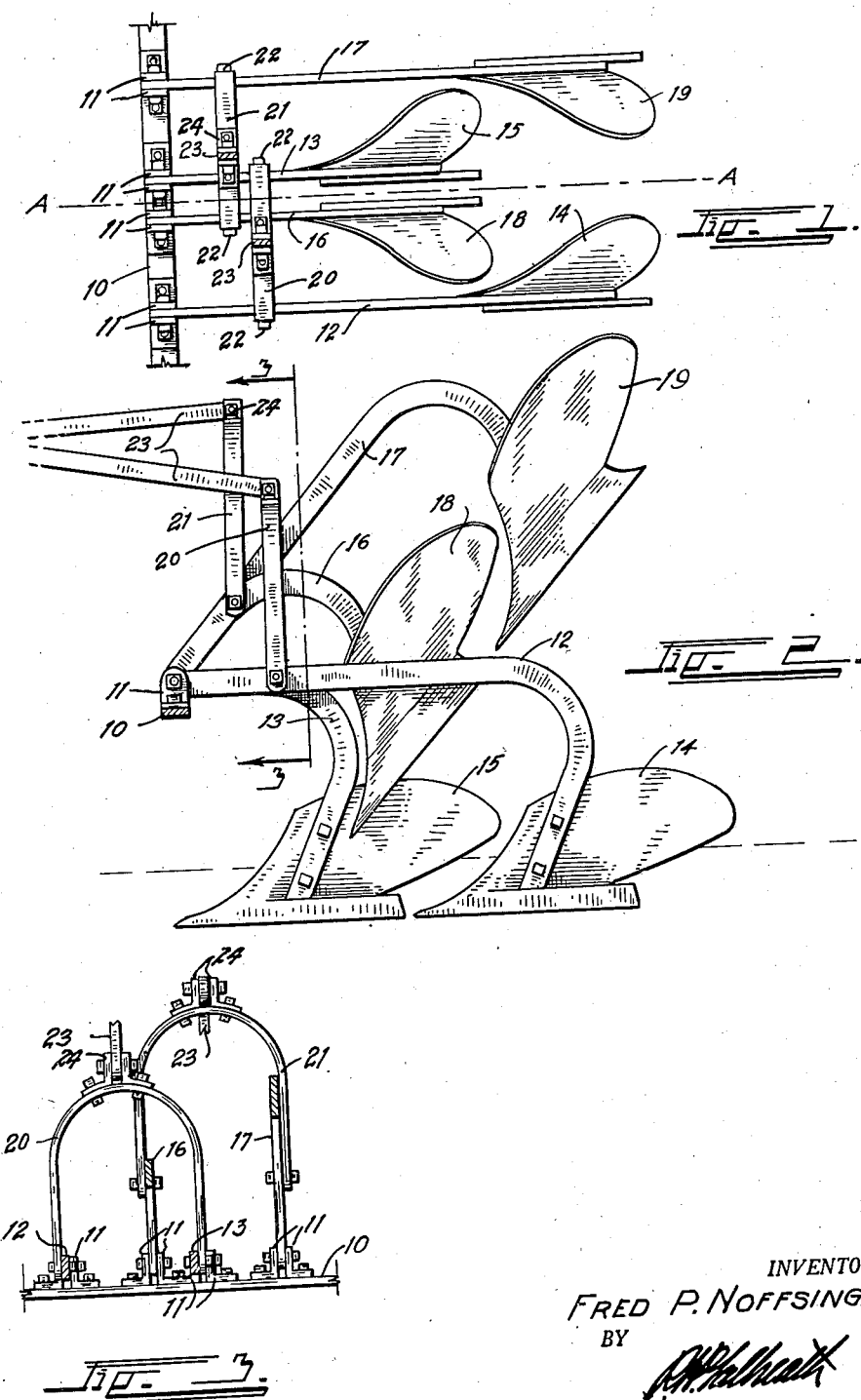
INVENTOR.
FRED P. NOFFSINGER.
BY
ATTORNEY.

Patented Sept. 11, 1945

2,384,483

UNITED STATES PATENT OFFICE 2,384,483

PLOW ATTACHMENT FOR TRACTORS

Fred P. Noffsinger, Greeley, Colo.

Original application March 16, 1944, Serial No. 526,740. Divided and this application September 23, 1944, Serial No. 555,529

3 Claims. (Cl. 97—29)

This invention relates to a two-way gang plow attachment for tractors of the type illustrated in applicant's copending application, Serial No. 526,740, filed March 16, 1944, of which this application is a division. The principal object of the invention resides in the provision of a plow arrangement whereby two-way gang plows may be mounted on a tractor without requiring any additional width over the usual two-way single plows.

Another object of the invention is to provide a two-way gang plow arrangement in which the drag will be balanced on the draw bar regardless of which direction of plow is being used so as to avoid the one sided drag of the usual two-way gang.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view illustrating the arrangement of the plows in this improved two-way gang plow;

Fig. 2 is a side view thereof, and;

Fig. 3 is a vertical cross-section, taken on the line 3—3, Fig. 2.

The plows may be attached to the tractor in any desired manner as this improvement relates more particularly to the arrangement of the plows in relation to each other. As illustrated, a draw bar is indicated at 100 to which the various plow beams are attached by means of suitable hinge clips 11 or in other suitable manner. The draw bar 10 may be attached to the tractor or may be a part thereof, as convenient.

A relatively long, right-hand plow beam 12 and a relatively short, right-hand plow beam 13 are attached to the draw bar 10, one on each side of the medial line thereof indicated at A, Fig. 1. The plow beams 12 and 13 terminate in a rear right-hand plow 14 and a forward right-hand plow 15, respectively.

A relatively short left-hand plow beam 16 is hingedly mounted at its forward extremity, on the draw bar 10 between the plow beams 12 and 13, and at one side of the medial line A. A relatively long left-hand plow beam 17 is hingedly mounted on the draw bar 10 to the right of the beam 13 and on the opposite side of the line A. The plow beam 16 terminates in a forward left-hand plow 18 and the plow beam 17 terminates in a rearward left-hand plow 19.

The first lifting arch bar 20 is pivotally secured to the beams 12 and 13. A second lifting arch bar 21 is similarly secured to the beams 16 and 17. The arch 20 overlaps the beam 16 and the arch 21 overlaps the beam 13. These arches are inverted U-shaped members secured to the beams at their lower extremities on pivot bolts 22, and secured at their tops by means of angle clips 24 to the plow lifting arms of the tractor, indicated at 23, in any desired manner.

It is believed that the advantages of the above described plow arrangement are apparent. Briefly, in the usual two-way, four bottom gang plow, the right-hand plows are mounted side by side adjacent one extremity of the draw bar and the two left-hand plows are similarly mounted adjacent the other extremity thereof. This requires a four plow width, since none of the plows can follow another plow. In this improved arrangement only a two-plow width is required, for the rearward left-hand plow is positioned behind the forward right-hand plow and the rearward right-hand plow is positioned behind the forward left-hand plow.

The operation and use of the device is not interfered with in any way for when the plows are turning right-hand furrows the left-hand plows are out of contact with the ground and the two right hand plows are spaced apart the proper furrow width. When plowing left-hand furrows the opposite is true.

Therefore, this improved arrangement results:

(1st) In much narrower width for the entire plow mechanism;

(2nd) In much shorter length for the plow beams, and (3rd) In a balanced drag regardless of which set of plows is being used.

It will be noted that in the previous arrangements all of the drag is to one side of the middle line A of the draw bar regardless of which set of plows is being used.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A two-way gang plow arrangement comprising: a rearward left-hand plow, a rearward right-hand plow, a forward right-hand plow, placed ahead of said rearward left-hand plow; a forward left-hand plow placed ahead of said rearward right-hand plow; a plow beam extending forwardly from each plow; means for pivotally mounting the forward extremity of each of said beams; a first lifting member connected to the beams of the two right hand plows; and a second lifting member connected to the beams of the two left hand plows so that the rearward extremities of the beams of the right hand plows may be lifted independently of the rearward extremities of the beams of the left hand plows.

2. A two-way plow comprising: a draw bar; two relatively long plow beams pivotally secured to said draw bar at their forward extremities and extending rearwardly therefrom; two relatively short plow beams pivotally secured to said draw bar intermediate the two long beams and extending parallel thereto; a rear right-hand plow on the rearward extremity of one of said long beams; a rear left-hand plow on the rearward extremity of the remaining long beam; a forward left-hand plow on the rearward extremity of one of said short beams; and a forward right-hand plow on the rearward extremity of the remaining short beam, said plows being positioned to alternate in hand transversely of the beams.

3. A two-way plow comprising: a draw bar; two relatively long plow beams pivotally secured to said draw bar at their forward extremities and extending rearwardly therefrom; two relatively short plow beams pivotally secured to said draw bar intermediate the two long beams and extending parallel thereto; a rear right-hand plow on the rearward extremity of one of said long beams; a rear left-hand plow on the rearward extremity of the remaining long beam; a forward left-hand plow on the rearward extremity of one of said short beams; and a forward right-hand plow on the rearward extremity of the remaining short beam; the forward-left-hand plow being positioned between the two right hand plows; a lifting member connecting the beams of the right-hand plows; and a second lifting member connecting the beams of the left-hand plows.

FRED P. NOFFSINGER.